United States Patent [19]

Sundblad et al.

[11] Patent Number: 5,770,171

[45] Date of Patent: Jun. 23, 1998

[54] PROCESS FOR PRODUCTION OF CHLORINE DIOXIDE

[75] Inventors: Birgitta Sundblad, Sundsvall; Anders Oscar Johan Dahl, Saltsjö-Boo, both of Sweden; John R. Winters, Marietta, Ga.

[73] Assignee: Eka Nobel Inc., Marietta, Ga.

[21] Appl. No.: 486,122

[22] Filed: Mar. 5, 1990

[51] Int. Cl.$^6$ .................................................. C01B 11/02
[52] U.S. Cl. ........................................... 423/479; 423/478
[58] Field of Search ..................................... 423/479, 478

[56] References Cited

U.S. PATENT DOCUMENTS

| | | | |
|---|---|---|---|
| 2,881,052 | 4/1959 | Julien et al. | 423/479 |
| 3,058,808 | 10/1962 | Ernest | 423/479 |
| 3,895,100 | 7/1975 | Cowley | 423/477 |
| 3,975,506 | 8/1976 | Cowley | 423/478 |
| 3,976,758 | 8/1976 | Fuller | 423/478 |
| 4,079,123 | 3/1978 | Fuller et al. | 423/478 |
| 4,081,520 | 3/1978 | Swindells et al. | 423/478 |
| 4,105,751 | 8/1978 | Caillol | 423/478 |
| 4,145,401 | 3/1979 | Swindells et al. | 423/478 |
| 4,465,658 | 8/1984 | Fredette | 423/478 |
| 4,473,540 | 9/1984 | Fredette | 423/479 |
| 4,627,969 | 12/1986 | Fredette et al. | 423/478 |
| 4,770,868 | 9/1988 | Norell | 423/479 |
| 5,002,746 | 3/1991 | Norell | 423/479 |
| 5,066,477 | 11/1991 | Zell et al. | 423/479 |

FOREIGN PATENT DOCUMENTS

| | | | |
|---|---|---|---|
| 0131378 | 1/1985 | European Pat. Off. | |
| 2569677 | 3/1986 | France | 423/479 |

OTHER PUBLICATIONS

"Further Studies on the Reaction of Formation of Chlorine Dioxide", Lenzi and Rapson, Pulp and Paper, Sep. 1962, pp. 442–448.

"The Mechanism of Formation of Chlorine Dioxide From Sodium Chlorate", Rapson, TAPPI, vol. 39, No. 8, Aug. 1956, pp. 554–556.

*Primary Examiner*—Kathryn L. Gorgos
*Attorney, Agent, or Firm*—Lowe, Price, LeBlanc & Becker

[57] ABSTRACT

A process for production of chlorine dioxide which is substantially free of by product chlorine. Chlorine-dioxide is produced from an alkali metal chlorate, a mineral acid and a reducing agent such as methanol in a reaction medium maintained at an acid normality of less than 9 and with a high chlorate molarity. The process is carried out in the substantial absence of additional chloride ion being fed to the process. It has been found that increasing the chlorate concentration at a given acid normality reduces the amount of chloride in the reaction medium thus reducing the amount of chlorine by-product. The process is carried out in a vessel operated under subatmospheric pressure, whereby water is evaporated and withdrawn together with chlorine dioxide and the alkali metal salt of the mineral acid is crystallized within the reaction vessel and withdrawn therefrom. According to the invention, high production rates with high efficiency of chlorine dioxide can be achieved while producing essentially no chlorine by-product.

11 Claims, No Drawings

PROCESS FOR PRODUCTION OF CHLORINE DIOXIDE

BACKGROUND OF THE INVENTION

1. Technical Field

The present invention lies in the field of chlorine dioxide production, and is specifically directed to a process for producing chlorine dioxide through reaction of an alkali metal chlorate, a mineral acid and a reducing agent. In particular, the invention provides for chlorine dioxide to be produced with essentially no chlorine by-product.

2. Description of the Prior Art

Chlorine dioxide in aqueous solution is of considerable commercial interest and importance not only in the area of pulp bleaching but in water purification, fat bleaching and removal of phenols from industrial wastes. Chlorine dioxide production is accordingly the subject of much research. Considerable research is also directed to the handling of reaction by-products such as chlorine and mineral acid salts. Chlorine in particular can adversely impact the environment and/or contaminate the chlorine dioxide product, and methods have been sought to either recycle chlorine or at least minimize its production. Chlorine not only presents unique separation and disposal problems of its own, it may also result in the formation, during the bleaching process, of small but significant amounts of dioxin, a well-known carcinogen.

Chlorine is produced as a by-product in all chlorine dioxide schemes involving the reduction of chlorate. This reaction equation is:

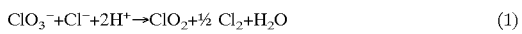
$$ClO_3^- + Cl^- + 2H^+ \rightarrow ClO_2 + \tfrac{1}{2}Cl_2 + H_2O \qquad (1)$$

An additional small amount of chlorine is also produced by side reaction according to the equation:

$$ClO_3^- + 6H^+ + 5Cl^- \rightarrow 3Cl_2 + 3H_2O \qquad (2)$$

The chlorine by-product produced in accordance with equations (1) and (2) has formerly been used as such in paper mills as a bleaching agent in aqueous solution, or it has been reacted with sodium hydroxide to form sodium hypochlorite and used as a bleaching agent. Today there is a tendency towards a more extensive chlorine dioxide bleaching and thus a decreasing need for chlorine and hypochlorite as bleaching agents.

Even when a need for chlorine does exist, a disadvantage of using by-product chlorine as a bleaching agent is that the concentration of the chlorine solution is very low, normally 1–5 gpl. Because of the large percentage of water in such solutions, modern bleaching systems cannot use by-product chlorine in the chlorination state. This means that many pulp mills consider chlorine by-product as having minimal value.

These factors have increased the urgency of developing a chlorine dioxide process of suitable efficiency and production rate having a significantly reduced production of chlorine by-product.

One prior art approach to reducing chlorine by-product has been the use of organic reducing agents in "Solvay"-type reactions. In a Solvay process, an alkali metal chlorate, typically $NaClO_3$ is reduced to chlorine dioxide in an acid environment via an organic reducing agent, typically methanol. Traditional theory holds that chloride ion is formed in situ by reaction of the reducing agent with the chlorine coproduced in accordance with reaction (1). A large percentage of the chlorine is thereby consumed in the reaction medium rather than being passed out of the system as effluent.

While this reaction scheme effectively reduces the amount of by-product chlorine, it is relatively inefficient using conventional multivessel reaction technology.

The problem of low efficiency in the Solvay process is addressed by U.S. Pat. No. 4,081,520, which suggests the use of a single vessel for continuous generation of chlorine dioxide, evaporation of the aqueous reaction medium and crystallization and removal of by-product alkali metal salt. Sulfuric acid is used at a normality in excess of about 9 in the reaction medium. This process and similar "single vessel process" (hereinafter "SVP") technologies generally increase efficiency to acceptable levels while maintaining low levels of chlorine effluent.

Production problems have sometimes been observed, however, when using the reaction conditions of the '520 patent. At random intervals, chlorine dioxide production in the reaction medium would cease and then resume after a period of time. This "random periodic loss of production", or "white-out", is believed to be due to the temporary depletion of chloride ion in the reaction medium. The risk of a white-out is thought to increase as acid normality is increased. The '520 patent itself mentions (col. 2, lines 21–25) that the quantity of sodium chloride in the reaction medium decreases "substantially" with increasing acid normality.

The apparent inverse relationship between chloride ion concentration and acid normality is borne out by the example in the '520 patent summarizing three "runs" made at acid concentrations of 4.4 normal, 8.04 normal and 9.3 normal. At 4.4 acid normality, chloride concentration in the generator liquor (i.e. reaction medium) was 0.39 molar and chlorine constituted 16% of the evolved gas (the rest being $ClO_2$ gas). At 8.04 acid normality the chloride concentration was 0.04 molar and chlorine was 12% of the evolved gas. At 9.3 acid normality, the chloride concentration was 0.003 molar and chlorine was less than 1% of the evolved gas. In each run, the chlorate ($NaClO_3$) concentration was at a relatively low value of 1.56 molar or less.

To prevent the total depletion of chloride ions at the conditions of the '520 patent (high acid normality and low chlorate molarity), U.S. Pat. No. 4,465,658 suggests the addition of chloride ions to the reaction medium of a SVP process operated at acid concentrations of 9 normal and above so that chloride ion is always present. Increased amounts of chloride ion, however, result in the production of additional unwanted chlorine by-product, thereby negating one of the primary advantages of the Solvay-type process.

U.S. Pat. No. 4,473,540 suggests that high efficiency of chlorine dioxide production may be achieved at acid normalities from below 9 normal down to about 7 normal with or without added chloride ions. This patent also teaches that chloride concentration in the reaction medium increases to a very high level when acidity is lowered to below 9 normal.

EPO 0,131,378 similarly mentions that commercial scale chlorine dioxide production can be effected at total acid normality below 9 and down to about 7 normal while the continuous addition of chloride ion to the reaction medium is omitted. Sodium chlorate concentration in the reaction medium is between 0.2 and 1.5 molar, and at acid normalities between 9 and about 7 the chloride ion concentration varies from about 0.1 to about 0.3 molar.

U.S. Pat. No. 4,770,868 also relates to chlorine dioxide production using methanol as reducing agent at different acid normalities. In order to avoid production losses, sodium chloride addition is recommended at amounts as high as up to 0.8 moles/l.

Several conclusions can be drawn from these prior art teachings. First, at acid normalities between 9 and about 7 and at chlorate concentrations of about 1.5 molar and below, sufficient chloride ion is produced in situ in the SVP reaction medium to obviate the need for adding chloride ion in the feed stream. Second, SVP processes run under these conditions of acid normality and chlorate concentration result in the evolution of considerable amounts of chlorine, even when no chloride ion is added to the system. Third, the concentration of chloride ion in the reaction medium and, hence, the amount of chlorine evolved increases with decreasing acid normality, and it would be expected that as acid concentration decreased further below about 7 normal, the concentration of chloride ion and the amount of evolved chlorine would be increasingly intolerable from the viewpoint of chlorine dioxide production efficiency and for environmental reasons, respectively.

Lastly, the prior art leads to the conclusion that the presence of relatively high levels of chloride ion in the reaction medium is to be encouraged to prevent white-out, and the evolution of chlorine is merely the unspoken price paid for maintaining continuous production.

Thus, and even though sodium chlorate can be produced containing as little as 0.5% by weight or less sodium chloride, it is conventional to add at least 1% by weight, often 4–5% by weight, of chloride to sodium chlorate before it is used in an SVP process to provide the high levels of chloride ions thought to be necessary to prevent white-out.

The prior art has accordingly failed to devise a satisfactory way of minimizing or eliminating chlorine production in chlorine dioxide processes while simultaneously maintaining high efficiency of chlorine dioxide production at commercially acceptable production rates.

SUMMARY OF THE INVENTION

It is accordingly an object of the invention to provide a chlorine dioxide process of high efficiency and high production rate.

It is another object of the invention to provide a process, as above, wherein little or no chlorine is formed as a by-product.

It is a further object of the invention to provide a process, as above, whereby operation is smooth, stable and relatively insensitive to small fluctuations in feed and production rate.

It is still another object of the invention to provide a process, as above, wherein white-out is prevented and simultaneously the production of chlorine is minimized.

The objects of the invention are achieved by a process for producing chlorine dioxide using SVP technology wherein the chlorate concentration in the reaction medium is maintained at a molarity higher than that used in prior art processes. The inventors have discovered that this higher chlorate concentration, when used in conjunction with an acid normality of less than about 9 in the reaction medium, allows the reaction to proceed without significant threat of white-out regardless of whether chloride ion is added to the reaction medium. With no added chloride ion, the level of chloride ion in the reaction medium is small but significant enough to prevent white-out. At the same time, the low level of chloride ion minimizes the production of chlorine.

In particular, the objects of the invention are achieved by a process of producing chlorine dioxide by reducing alkali metal chlorate with an organic reducing agent in an aqueous reaction medium containing a strong acid such as sulfuric acid, the reaction medium being maintained in a single-chambered generator-evaporator-crystallizer apparatus under a subatmospheric pressure, the process including the steps of maintaining the reaction medium at its boiling point at a temperature below that above which substantial decomposition of chlorine dioxide occurs to evaporate water from the reaction medium and provide a gaseous mixture containing steam and chlorine dioxide; removing the gaseous mixture from the single-chambered apparatus; recovering an aqueous solution of chlorine dioxide from the removed mixture; maintaining substantially steady state conditions in the reaction medium by continuously feeding the alkali metal chlorate, organic reducing agent and sulfuric acid into the reaction medium to make up chemicals consumed in the reducing step and to maintain a total acid normality in the reaction medium of below about 9 normal and at least about 2.4 normal, and a chlorate concentration in the reaction medium of between about 1.6 molar and saturation; maintaining the liquid level in the single-chambered apparatus substantially constant by balancing water fed to the single-chambered apparatus with water removed therefrom; continuously depositing alkali metal sulfate salt from the reaction medium after the reaction medium becomes saturated thereby after the initial start up of the process, and removing the deposited alkali metal sulfate from the single-chambered apparatus; wherein the reduced chloride ion concentration in the reaction medium results in less chlorine concentration in the gaseous mixture.

DETAILED DESCRIPTION OF THE PREFERRED EMBODIMENTS

It has been found that increasing the chlorate concentration at a given acid normality reduces the amount of chloride in the reaction medium thus reducing the amount of chlorine by-product. Under certain process conditions, the presence of chloride ion above a minimum level in a Solvay-type process is not needed to obtain high efficiency production of chlorine dioxide at a high production rate. This discovery is unexpected in view of the historical view of the role of chloride ion and has significant commercial application. In the present invention, high production rates are achieved with high efficiency when the chlorate concentration in the reaction medium is maintained at a high level and the acid normality of the reaction medium is maintained below about 9 normal.

This high level of chlorate concentration results in a very low level of chloride ion in the reaction medium and hence a very low level of evolved chlorine. White-out is nevertheless avoided under these conditions because there is always a small but significant level of chloride ion continuously formed in situ.

Because a sufficient amount of chloride ion is formed in situ, the process can proceed in the substantial absence of added chloride ion. By substantial absence of added chloride ion is meant the process can use conventional, commercially available chlorate without the need for adding additional salt (i.e. alkali metal chloride) to the process. Conventional alkali metal chlorate, (prior to the now-conventional addition of salt), contains no more than about 0.5, often no more than about 0.05, preferably no more than about 0.02, most preferably no more than about 0.01, weight percent alkali metal chloride. While small additions of alkali metal chloride could be made to the chlorate, such additions are not necessary and generally not desired.

A specific feature of the process is that chlorate molarity is at least about 1.6 molar and can be as high as saturation. The acid concentration of the process is from about 2.4 normal to about 9 normal.

The invention is applicable to processes with organic reducing agents for the reduction of chlorine to chloride ion such as formaldehyde, methanol, ethanol, isopropanol and other oxidizable organic compounds. A preferred reducing agent is methanol.

One of the factors that affects the range of chlorate concentration is acid normality. At acid normality of from about 2.4 to about 4.5, the chlorate concentration can range from about 2 molar to saturation. At acid normalities of from about 4.5 to less than about 9, the chlorate concentration can be as low as 1.6 molar and as high as saturation. The actual chlorate saturation concentration is a function of, inter alia, the operating temperature and pressure and acid normality and can be as high as about 5 molar. Preferably, the acid normality is maintained between about 5.5 and about 8.5. In a highly preferred embodiment, the acid normality is maintained between about 5.5 and about 6.9 and the chlorate molarity is between about 3 and saturation.

At operation at these conditions the chlorine dioxide production process is smooth and stable and insensitive to fluctuations in feed and production rate. The process is, therefore, easy to control with small risks for white-outs.

By operating the process under the above conditions the amount of formed chlorine can be kept less than about 2.5% by weight of the total evolved gas. Preferably, the conditions are chosen so that formed chlorine is less than about 2.2% by weight of the total evolved gas, and most preferably less than about 1.7% by weight of the total evolved gas.

At acidities above about 4.5 normal up to about 9 normal, the crystals formed are needle shaped sodium sesquisulfate, $Na_3H(SO_4)_2$.

These sesquisulfate crystals tend to form clustered agglomerates which give a hard salt cake on the filter, increasing the problem of breaking off of the washed cake for further handling.

The shape of the needles is dependent on acidity and the shorter needles obtained at low acidities are more easily separated on the filter since they do not form as hard a filter cake as do the longer needles obtained at high acidities. Hence, as the acidity approaches the lower limit of 4.5 normal for sesquisulfate formation, the needles become shorter and wider and hence easier to handle.

A steady continuous filter operation for the precipitated sodium sulfate is essential for the reliability of the total process of chlorine dioxide generation. The washing of the salt cake is more efficient in the case with short needles, since the long needles give a more heterogeneous cake with increased channeling of the wash water. Also, the lower acidity leads to a lower sulfuric acid contamination of the salt cake.

The release of the salt cake from the filter is often made with a jet of air or steam or by the aid of a mechanical knife or scraper. In this step, the salt cake containing short needles is looser and more easily broken up and released compared to the harder salt cake obtained at high acidity.

Best results for the production of chlorine dioxide according to the invention are obtained by using sodium chlorate as the alkali metal chlorate. Methanol is the preferred reducing agent. It is suitable to operate the reaction vessel under a pressure of 60–400 mm Hg absolute, preferably 90–200 mm Hg and at a temperature of 50°–90° C., preferably 60°–75° C.

The $ClO_2$-producing reactions are favored by the addition of small amounts of catalysts to the reactor. The active catalysts belong to the groups VB-VIII, IB, IVA and VIIA of the Periodic Table of the elements. The highest activity has been found for compounds containing V, Nb, Cr, Mn, Fe, Ru, Os, Co, Ni, Pd, Pt, Cu, Ag, Ge, Sn, Pb, Br or I either separate or in combinations.

The following example illustrates the invention.

EXAMPLE

A laboratory chlorine dioxide generator was operated at a production rate of 180 g $ClO_2$/hr at a pressure of 150 mm Hg absolute. A solution of 550 gpl $NaClO_3$ was continuously fed with 517 ml/hr to the generator. Methanol was added as a 50 wt % solution in water at a feed rate of 71 ml/hr and sulfuric acid was fed in 93 wt % concentration in a rate sufficient to keep the desired acidity.

A gas mixture of chlorine dioxide, water vapor, chlorine, formic acid, carbon dioxide methanol and air left the generator and was absorbed in water.

Crystals were continuously formed in the generator and periodically discharged to keep an essentially constant slurry density within the generator.

A series of experiments at different acid normalities and without salt addition was run. As can be seen from Table 1, low amounts of chlorine were formed. The tests were repeated with chloride ions purposely added to the reaction liquor. From Table 2, it can be seen that the amount of chlorine formed was increased substantially.

TABLE 1

| Acidity (N) | Chloride in feed wt % | Chlorate in generator (M) | Chloride in generator (mM) | $Cl_2/ClO_2$ wt % |
|---|---|---|---|---|
| 6.0 | 0.02 | 3.9 | 6.5 | 0.3 |
| 6.4 | 0.02 | 4.1 | 4.3 | 0.1 |
| 8.9 | 0.02 | 1.6 | 2.0 | 0.1 |

TABLE 2

| Acidity (N) | Chloride in feed wt % | Chlorate in generator (M) | Chloride in generator (mM) | $Cl_2/ClO_2$ wt % |
|---|---|---|---|---|
| 6.5 | 2.5 | 4.0 | 30 | 2.9 |
| 7.8 | 2.5 | 2.1 | 30 | 4.0 |

The invention has been illustrated by the above-described preferred embodiments. It is to be understood, however, that the preferred embodiments are offered by way of illustration only, and are not to be construed as limiting the invention. Such embodiments of the invention as fall within the scope and purview of the appended claims are to be considered as part of this invention.

What is claimed is:

1. A process for producing chlorine dioxide by reducing alkali metal chlorate with methanol, ethanol or isopropanol as organic reducing agent in an aqueous reaction medium containing sulfuric acid, said reaction medium maintained in a single-chambered generator-evaporator-crystallizer apparatus under a subatmospheric pressure, the process including the steps of maintaining said reaction medium at its boiling point at a temperature below that above which substantial decomposition of chlorine dioxide occurs to evaporate water from said reaction medium and provide a gaseous mixture containing steam and chlorine dioxide;

removing said gaseous mixture from said single-chambered apparatus, recovering an aqueous solution of chlorine dioxide from said removed mixture;

maintaining the liquid level in said single-chambered apparatus substantially constant by balancing water fed to the single-chambered apparatus with water removed therefrom;

continuously depositing alkali metal sulfate salt from said reaction medium after the reaction medium becomes saturated thereby after the initial start up of the process, and removing said deposited alkali metal salt from said single-chambered apparatus, wherein substantially steady state conditions are maintained in said reaction medium by continuously feeding said alkali metal chlorate, organic reducing agent and sulfuric acid in the substantial absence of added chloride ions into said reaction medium to make up chemicals consumed in said reducing step and to maintain a total acid normality in said reaction medium of less than 9 normal and at least 5.5 normal, and a chlorate concentration of between 1.6 molar and saturation.

2. The process according to claim 1, wherein the alkali metal chlorate is sodium chlorate.

3. The process according to claim 1, wherein the amount of evolved chlorine is less than about 1.7% by weight of the total evolved gas.

4. The process according to claim 1, wherein the chloride concentration in the chlorate feed to the reaction medium is less than 0.5 weight percent.

5. The process according to claim 1, wherein the reducing agent is methanol.

6. The process according to claim 1, wherein the process includes a catalyst selected from the group consisting of elements from Groups VB-VIII, IB, IVA, and VIIA of the Periodic Table.

7. The process according to claim 6, wherein the catalyst is selected from the group consisting of V, Nb, Cr, Mn, Fe, Ru, Os, Co, Ni, Pd, Pt, Cu, Ag, Ge, Sn, Pb, Br, I and combinations thereof.

8. The process according to claim 1, wherein the acid normality in the reaction medium is from about 5.5 to about 8.5 and the chlorate concentration in the reaction medium is from about 2 molar to saturation.

9. The process according to claim 1, wherein, in the reaction medium, the acid normality is from about 5.5 to about 6.9 and the chlorate concentration is from about 3 molar to about saturation.

10. The process according to claim 1, wherein the pressure in the reaction is varied from about 60 to about 400 mm Hg absolute and the temperature of the reaction medium is from about 50° C. to about 90° C.

11. The process according to claim 1, wherein the alkali metal sulfate salt is alkali metal sesquisulfate.

* * * * *